United States Patent [19]

Tuma et al.

[11] Patent Number: 5,092,158
[45] Date of Patent: Mar. 3, 1992

[54] APPARATUS FOR TESTING LEAK DETECTORS

[75] Inventors: John E. Tuma, Houston; Barry N. Williams, Rosharan, both of Tex.

[73] Assignee: Tanknology Corporation International, Houston, Tex.

[21] Appl. No.: 538,891

[22] Filed: Jun. 15, 1990

[51] Int. Cl.$^5$ ............................................. G01M 3/08
[52] U.S. Cl. ........................................ 73/3; 73/4 R; 73/40.5 R
[58] Field of Search ............. 73/40, 40.5 R, 3, 861.58, 73/861.52, 199, 4 R; 137/491

[56] References Cited

U.S. PATENT DOCUMENTS

| | | | |
|---|---|---|---|
| 2,952,387 | 9/1960 | Fowler et al. | 73/40.5 R |
| 2,952,388 | 9/1960 | Deters | 73/40.5 R |
| 3,183,723 | 5/1965 | Deters | 73/40.5 R |
| 3,692,050 | 9/1972 | Deters | 137/491 |
| 4,901,751 | 2/1990 | Story et al. | 73/40.5 R |

OTHER PUBLICATIONS

Engineering Report: Leak Detector, Red Jacket ® Pumps/ A Marley Company (Jan., 1985).
Engineering Report: Test Procedure for Mechanical Leak Detectors, Red Jacket ® Pumps (Nov. 1990).
The Marley Pump Company/Red Jacket Pumps sales brochure, "Red Jacket Diaphram Leak Detector" (Feb., 1987).
The Marley Pump Company/Red Jacket Pumps sales brochure, "Red Jacket PLD" (Feb., 1990).
Vaporless Manufacturing, Inc., sales brochure "LDT-880 Leak Detector Testing System" (date unknown) and Operating Instructions for LDT-880 (Apr. 24, 1989).

Primary Examiner—Hezron E. Williams
Assistant Examiner—Craig Miller
Attorney, Agent, or Firm—Vaden, Eickenroht, Thompson & Boulware

[57] ABSTRACT

Apparatus for testing a diaphragm or piston-type pressure-actuated detector of leaks in a hose, pipe, or other conduit. Fluid at a selected pressure is introduced into a manifold through the leak detector being tested, and the manifold is provided with a plurality of flow restrictors which allow flow at a selected rate at a selected pressure. In this manner, a leak detector which allows flow at a rate higher than a selected pressure can be rejected as not functioning properly. Further, the flow rate through that detector can also be tested at a given pressure. The apparatus is also capable of operating off of pressure developed by a submerged pump for testing the leak detector without removal of the leak detector from the submerged pump.

14 Claims, 1 Drawing Sheet

APPARATUS FOR TESTING LEAK DETECTORS

BACKGROUND OF THE INVENTION

The present invention relates to an apparatus for testing leak detectors to insure that they are working properly. In more detail, the present invention relates to an apparatus for testing a pressure-actuated detector of leaks in a hose, pipe, or other conduit which is capable of both testing the leak detector and measuring actual flow rate of the detector.

The following description of the apparatus of the present invention will be made with reference to gasoline storage tanks and retail gasoline pumping equipment because that is perhaps the most likely application. However, those skilled in the art who have the benefit of this disclosure will recognize that the invention is equally useful in any application in which fluids are being pumped from a storage tank through a pipe, hose, or other conduit by a submerged or other type of pump which is equipped with a pressure-actuated device for testing for leaks in the pipe, hose, or conduit through which the fluid is pumped.

The underground gasoline storage tanks of gasoline service stations are equipped with pumps, usually submerged pumps, for pumping the gasoline up out of the tank, through a hose, and into a vehicle's gas tank. Leakage from those storage tanks is a serious environmental problem, and equally as serious, is a leak from the hose, pipe or other conduit through which the fuel is pumped for delivery to the vehicle's gas tank. To detect leaks between the dispenser at the end of the hose, pipe, or other conduit and the pump, a pressure-activated leak detector, generally including a diaphragm or piston-operated valve, is placed in the flow downstream of the pump. Such leak detectors are available from, for instance, The Marley Pump Company (Mission, Kans.) under the trademark "RED JACKET".

When pressure in the hose, pipe, or conduit of such an installation is less than about one psi and the submerged pump is turned on, a controlled amount of product (for instance, three gallons per hour) is metered though the leak detector into the piping system. If a leak is present that equals or exceeds this metered amount, as much product escapes from the system as is metered in through the leak detector. Under this condition, pressure cannot build up in the piping system. When a dispensing nozzle is opened to deliver the product to the vehicle, a poppet in the leak detector moves to a position that restricts the flow to approximately 1 or 1½ to 3 gallons per hour. This restricted flow provides an indication to the operator that a leak is present in the line.

If there are no leaks, pressure rapidly builds in the system, forcing the leak detector to open to the full-flow position. In a system with no leaks, it takes only a matter of a few seconds to complete such a test. No further line testing takes place until the line pressure once again drops below one psi.

Recent government regulations now require annual testing of the leak detector to further insure that no leaks are present which exceed the maximum allowable rate. So far as is known, there is but one device available commercially which can provide quick and accurate testing of leak detectors That device, manufactured by Vaporless Manufacturing, Inc. (Prescott Valley, Ariz.) and sold as model number "LDT-880" is, however, characterized by a number of disadvantages which limit its utility. Specifically, that apparatus uses a needle valve and the submerged pump to simulate a three gph (or other flow rate) "leak" of product and requires the measurement of the volume which "leaks" to test the leak detector. Of course, that product is gasoline in the case of a leak detector installed in a gasoline storage tank such that the "leak" creates an unsafe condition; further, the requirement for an operator-read measurement creates a source of error. Most importantly, however, the tester is not "self-contained", e.g., it requires that testing be conducted on site because the use of the submerged pump to pump product through the "leak" is required.

The apparatus of the present invention, however, overcomes these disadvantages and limitations of that tester by providing a set of flow restrictors to allow testing at specified flow rates and given pressures which allows either a "yes" or "no" test of the condition of the leak detector. The apparatus also allows the measurement of actual flow rate by observation of the pressure produced by the detector across the restrictor. Further, the fluid which flows through the flow restrictors is preferably water. It is, therefore, an object of the present invention to provide such a tester.

Another object of the present invention is to provide a leak detector tester which is self-contained but which, if need be, can be operated by the pump submerged in a storage tank.

Another object of the present invention is to provide a leak detector tester which is safer to use than the only known commercially available leak detector tester.

Another object of the present invention is to provide a method of measuring the flow rate through a leak detector.

Other objects, and the advantages, of the present invention will be made apparent by the following detailed description of a presently preferred embodiment thereof.

SUMMARY OF THE INVENTION

These objects are achieved by providing an apparatus for testing a pressure-actuated detector of leaks in a hose, pipe, or other conduit comprising a pressurized tank having a fluid therein, a mount adapted for sealingly receiving a pressure-actuated leak detector and having a chamber therein in fluid communication with the interior of the poppet of the leak detector received within the mount, and a capillary tube extending down into the fluid in the pressurized tank for routing fluid out the tank into the chamber in the mount. A manifold having a plurality of valves mounted thereto is also in fluid communication with the interior of the poppet of the leak detector, and a plurality of flow restrictors having lengths selected so as to pass fluid under selected pressures are provided, each of the flow restrictors being mounted to one of the valves on the manifold for passing fluid therethrough when the respective valve to which the flow restrictors are mounted is opened and the pressure in the manifold exceeds the pressure drop of the fluid in the flow restrictors.

DETAILED DESCRIPTION OF THE PREFERRED EMBODIMENT

Figure 1:
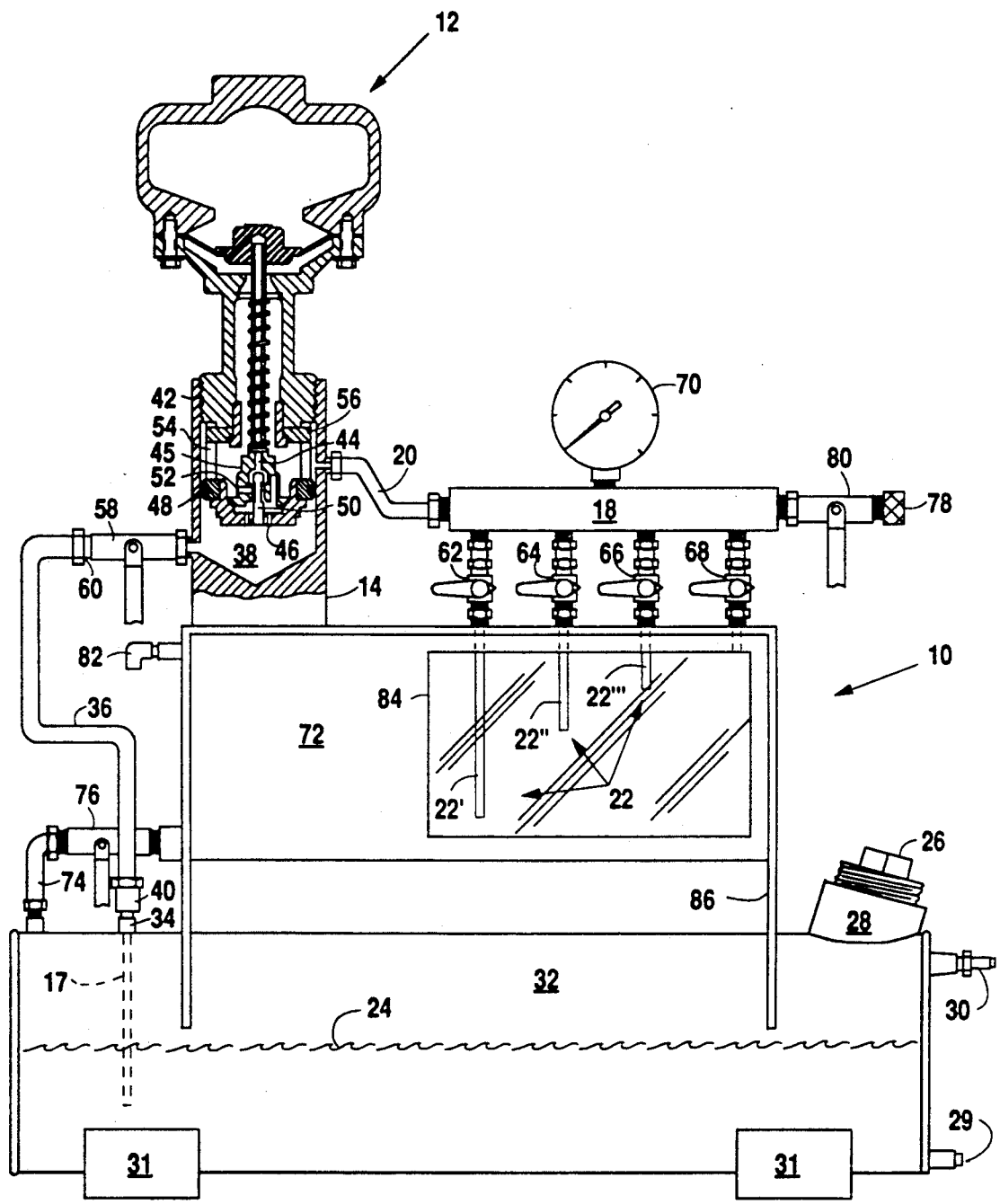
FIG. 1 is a schematic, partially sectional view of a presently preferred embodiment of an apparatus constructed in accordance with the present invention.

Referring to FIG. 1, there is shown a presently preferred embodiment of a leak detector tester constructed in accordance with the present invention at reference numeral 10. A diaphragm-type, pressure-actuated leak detector, indicated generally at reference numeral 12, of the type available from the Marley Pump Company referenced above, is received within a mount, indicated generally at reference numeral 14, for testing in the apparatus 10.

Leak detector tester 10 is comprised of the mount 14, a pressure tank 16, capillary tube 17, manifold 18, the hose 20 for routing fluid from within mount 14 to manifold 18, and a plurality of flow restrictors 22 mounted to manifold 18. In more detail, pressure tank 16 is a closed tank for containing a fluid 24 (preferably water) therein and having a plug 26, filler neck 28, and drain 29 for convenient filling and draining of the tank 16, and is supported on cradle legs 31. A quick disconnect 30 is provided for connection of pressure tank 16 to a source of gas (not shown), preferably nitrogen, for pressurizing the ullage 32, e.g., the space within pressure tank 16 above fluid 24. The capillary tube 17 extends down into fluid 24 through fitting 34 and connects through hose 36 to the chamber 38 in mount 14. A filter 40 is provided between fitting 34 and hose 36 for removing any particulate matter from the fluid 24 which is forced out of pressure tank 16 to prevent the clogging of flow restrictors 22.

Mount 14 is adapted for sealingly receiving a pressure-activated leak detector 12 by providing threads 42 of a diameter sized to mate with the threads (not numbered) on leak detector 12 (two inch n.p.t. is a standard thread in the industry for the leak detector, but various adapter sleeves (not shown) can be provided for threads and/or pitches other than that standard). When leak detector 12 is received within mount 14 by screwing into threads 42, the interior 44 of the poppet 45 of leak detector 12 is in fluid communication with the chamber 38 in mount 14 so that fluid forced up into capillary tube 17 through hose 36 into chamber 38 also flows through the extrance/exit ports 46 in the bottom of leak detector 12 into the interior 44 of poppet 45. The leak detector 12 is provided with an O-ring 48, or other sealing means, bearing against the walls of chamber 38 so that fluid in chamber 38 cannot pass into hose 20 without passing through the metering valve formed by the interaction of poppet 45 and metering pin 50, the orifice 52 in poppet 45, and the entrance/exit ports 54 in the wall 56 of leak detector 12 above O-ring 48. Hose 20 connects through appropriate fittings to manifold 18 so that fluid which passes out of the ports 54 continues into the interior of manifold 18. A valve 58 is provided in the fitting 60 for opening and closing the hose 36 between capillary tube 17 and chamber 38.

Manifold 18 is provided with a plurality of valves, three of which are shown in the preferred embodiment at reference numerals 62, 64, and 66, mounted thereto which are open to the interior of manifold 18. A plurality of flow restrictors 22', 22", 22"', each of which is mounted to a respective valve 62, 64, and 66, are in fluid communication with the interior of manifold 18, and a pressure bleed valve 68, also in communication with the interior of manifold 18, is provided for bleeding off any fluid in manifold 18 to release the pressure therein. A pressure gauge 70 is provided for monitoring the pressure in the interior of manifold 18 for purposes to be described below. Each of the flow restrictors 22, and the valve 68, communicates with the interior of a holding tank 72 for catching any fluid which passes therethrough and returning such fluid to pressure tank 16 through line 74. A valve 76 is provided in line 74 for selectively emptying holding tank 72 into pressure tank 16 as required. A quick disconnect test port 78, mounted to valve 80, also communicates with the interior of manifold 18. An air vent 82 allows the air in holding tank 72 to vent to the atmosphere as holding tank 72 fills with fluid from pressure tank, and a window 84 in the wall of holding tank 72 provides a view of flow restrictors 22, and together with filter 40, comprises a means for preventing the clogging of the flow restrictors 22 since a decreased flow, or a stoppage in flow, through one of the restrictors 22 is visible therethrough. For purposes of convenience, holding tank 72 is preferably mounted on the legs 86 on top of pressure tank 16.

Having described an apparatus constructed in accordance with the present invention, the operation thereof will now be described by reference to that apparatus 10. After screwing the leak detector 12 into mount 14 on threads 42, the plug 26 is removed from filler neck 28 and pressure tank 16 is filled approximately half to three quarters of the way full with water. The plug 26 is then replaced and a supply of pressurized nitrogen gas attached to the quick disconnect 30. The nitrogen gas is applied to pressure tank 16 at a selected pressure (presently preferred is a pressure of no more than about 28 psi) with the valves 58 and 76 closed. Valves 62, 64 and 66 are then opened and valve 58 is thereafter opened, after which all three of the flow restrictors 22 should flow water therethrough. The valves 58, 62, 64 and 66 are then closed and valve 68 is used to bleed pressure out of manifold 18 by allowing the water contained therein to flow into holding tank 72.

Valve 68 is then closed and valve 64 opened, after which valve 58 is opened and pressure in manifold 18 is monitored on pressure gauge 70. The length of the flow restrictor 22" is selected so as to pass water under selected pressure such that, for instance, when the pressure in pressure tank 16 is about 28 psi, water flows through flow restrictor 22" at a rate of about 3 gallons per hour and the pressure gauge 70 will show a pressure of about 10 psi. In the case of a piston-type leak detector, the length of flow restrictor 22' is selected so as to give a flow rate of about 3 gallons per hour with an initial pressure on pressure gauge 70 of approximately 20 psi followed by a drop to about 10 psi. The length of the third flow restrictor 22"' is selected for any convenient reference flow, for instance, a length such that water under a pressure of about 20 psi will flow at a rate of 4.5 gph. If the pressure gauge reads a pressure above 10 psi (in the case of a diaphragm-type leak detector with flow through valve 64 being restricted by flow restrictor 22") or 20 psi (in the case of a piston-type leak detector with flow through valve 66 being restricted by flow restrictor 22') the leak detector 12 is not working properly, and pressure will rise to approximately the same pressure (28 psi) as found on the pressure tank 16 side of leak detector 12.

In addition to this "yes/no" test for the condition of the leak detector 12, the flow rate through a leak detector 12 is monitored by observing the pressure produced by the leak detector across flow restrictors 22. If flow rate is exactly 3 gallons per hour, then approximately a 10 (or 20, depending on whether the leak detector being tested is of piston or diaphragm-type, respectively) psi pressure will be maintained in manifold 18. If the pressure in manifold 18 drops below that 10 or 20 psi test pressure, then the leak detector 12 is producing a lower flow rate than 3 gph. For example, a leak detector 12 which tests "yes" might flow about 1.5 gph, in which case, the 10 psi is not exceeded such that the poppet 45 does not move upwardly out of the flow path to allow full flow through leak detector 12. The pressure across flow restrictor 22" then falls from about 10 to about 5 psi. Flow rate is measured in this manner by any pressure drop in manifold 18.

In certain installations, the operator will find that the submerged pump in the storage tank is covered with water such that the leak detector 12 cannot be removed therefrom. In that situation, the apparatus 10 is still capable of being used to test the leak detector without screwing the leak detector into mount 14. To do so, the test plug (not shown) is removed from the impact valve (not shown) under the dispenser of the gasoline (e.g., what the retail consumer refers to as "gas pump") and the disconnected hose is connected to the test port 78 on manifold 18 and the submerged pump is turned on. The valve 64 is then opened and then valve 80 is opened. As was the case with the diaphragm-type leak detector described above, fluid should flow through flow restrictor 22" when pressure gauge 70 reaches approximately 10 psi. If pressure increases above 10 psi, the leak detector is malfunctioning and needs to be replaced.

Although the invention has been described in terms of the presently preferred apparatus shown in the figures, it will be recognized by those skilled in the art who have the benefit of this disclosure that certain changes in the structure thereof can be made without departing from the manner in which the various structural elements function to produce their intended results. For instance, the valve 62, 64, and 66 and their respective flow restrictors 22', 22", and 22'", can be replaced by precision gate valves, the openings of which are calibrated to restrict flow therethrough in the same manner as the action of the surface tension of the fluids on the walls of the flow restrictors 22', 22", and 22'". Similarly, the pressure provided by the nitrogen gas at quick disconnect 30 can also be provided with a pump acting directly on the fluid 24 and/or a metering valve in the line 36 to control precisely the pressure of the fluid in line 36. All such changes, and the many other changes which could also be made, are intended to fall within the scope of the following claims.

What is claimed is:

1. An apparatus for testing a pressure-actuated detector of leaks in a hose, pipe, or other conduit comprising:
    a pressurized tank having a fluid therein;
    a mount adapted for sealingly receiving a pressure-actuated leak detector and having a chamber therein in fluid communication with the interior of the poppet of a leak detector received within said mount;
    a capillary tube extending down into the fluid in said pressurized tank for routing fluid out of said tank into the chamber in said mount;
    a manifold having a plurality of valves mounted thereto in fluid communication with the interior of the poppet of the leak detector; and
    a plurality of flow restrictors having lengths selected so as to pass fluid under selected pressures, each of said flow restrictors being mounted to one of the valves on said manifold, for passing fluid therethrough when the respective valve to which said flow restrictors are mounted is opened and the pressure in said manifold exceeds the surface tension of the fluid in said flow restrictors.

2. The apparatus of claim 1 additionally comprising a holding tank for catching the fluid passing through the flow restrictors and returning such fluid to said reservoir.

3. The apparatus of claim 2 additionally comprising means for detecting the clogging of the flow restrictors.

4. The apparatus of claim 3 wherein said clog detecting means comprises a window in said tank for viewing said flow restrictors.

5. The apparatus of claim 1 additionally comprising means for preventing the clogging of the flow restrictors.

6. The apparatus of claim 5 wherein said clog preventing means comprising a filter in said capillary tube for routing fluid from said pressurized tank to the chamber in said mount.

7. The apparatus of claim 1 additionally comprising a valve on said manifold adapted for receiving a hose, pipe, or other conduit from a submerged pump.

8. The apparatus of claim 1 additionally comprising a pressure gauge mounted to said manifold.

9. An apparatus for testing leak detectors comprising:
    a mount for receiving a leak detector in sealing engagement therein and having a chamber therein in fluid communication with the interior of the poppet of a leak detector through either the entrance or exit port of the leak detector when the leak detector is received by said mount;
    a source of fluid under relatively constant pressure in fluid communication with the chamber in said mount;
    a plurality of valves in fluid communication with the interior of the poppet of the leak detector received within said mount through either the entrance or exit port of the leak detector opposite the port through which the chamber in said mount communicates with the interior of the poppet; and
    a flow restrictor mounted to each of said valves, each flow restrictor having a length selected so as to pass a desired flow of the pressurized fluid when the valve to which said flow restrictor is mounted is opened and the decrease in the pressure of the pressurized fluid passing through the leak detector is less than the surface tension of the fluid in the flow restrictor.

10. The apparatus of claim 9 wherein said valves are mounted to a manifold, the interior of which is in fluid communication with said valves and the poppet in the leak detector.

11. The apparatus of claim 10 additionally comprising a test port in fluid communication with the interior of said manifold for connecting a hose from another source of pressurized fluid thereto.

12. The apparatus of claim 9 wherein said fluid source is a pressure tank having a fluid under relatively constant pressure contained therein.

13. The apparatus of claim 12 wherein the pressurized fluid is forced out of said pressure tank through a capillary tube into the chamber in said mount by the pressure in said tank.

14. The apparatus of claim 12 wherein fluid passing through said flow restrictors is caught by a holding tank for return to said pressure tank.

* * * * *